United States Patent [19]
Lanfranconi et al.

[11] 4,360,706
[45] Nov. 23, 1982

[54] ELECTRIC CABLES OF REDUCED MICRO-VOIDS IN THE EXTRUDED INSULATION

[75] Inventors: Gianmario Lanfranconi, Trezzo d'Adda; Bernardino Vecellio, Milan, both of Italy

[73] Assignee: Industrie Pirelli S.p.A., Milan, Italy

[21] Appl. No.: 139,829

[22] Filed: Apr. 14, 1980

Related U.S. Application Data

[62] Division of Ser. No. 30,726, Apr. 17, 1979, Pat. No. 4,259,281.

[51] Int. Cl.³ .............................................. H01B 9/02
[52] U.S. Cl. ...................... 174/105 SC; 174/110 PM; 174/120 SC
[58] Field of Search .................. 174/110 PM, 102 SC, 174/105 SC, 106 SC, 120 SC

[56] References Cited

U.S. PATENT DOCUMENTS

| | | | |
|---|---|---|---|
| 2,462,149 | 2/1949 | Webb | 264/102 X |
| 3,452,126 | 6/1969 | Sieron | 264/102 |
| 3,819,410 | 6/1974 | Kuckro et al. | 174/110 PM X |
| 4,005,254 | 1/1977 | MacKenzie | 174/110 PM |
| 4,029,830 | 6/1977 | Yamamoto et al. | 174/110 PM X |

OTHER PUBLICATIONS

Yoda et al., Development of EHV Cross-Linked Polyetheylene Insulated Power Cables, IEEE Trans. Power App. & Systems, V. PAS 92 #2, Mar.-Apr., 1973, pp. 506 to 512.
Kageyama et al., Micro-Voids in Cross-Linked Polyetheylen Insulated Cables, IEEE Transaction of Power Appar. & Syst. (V. PAS 94 #4, 7/08/75, pp. 1258-1263.

Primary Examiner—Richard R. Kucia
Attorney, Agent, or Firm—Brooks, Haidt, Haffner & Delahunty

[57] ABSTRACT

A product by process for reducing micro-voids in cross-linked cable insulation without reducing the voltage breakdown strength thereof in which process the insulation, after cross-linking, is heated at a temperature in the range from about 120° C. to about 150° C. and under a pressure less than 10 mm. Hg for a period from about 8 hours to 48 hours. Also, a cable having such insulation which has micro-voids less than about $10^2$ per mm³ and a perforation gradient greater than the perforation gradient of a cable which has not been so treated.

4 Claims, 1 Drawing Figure

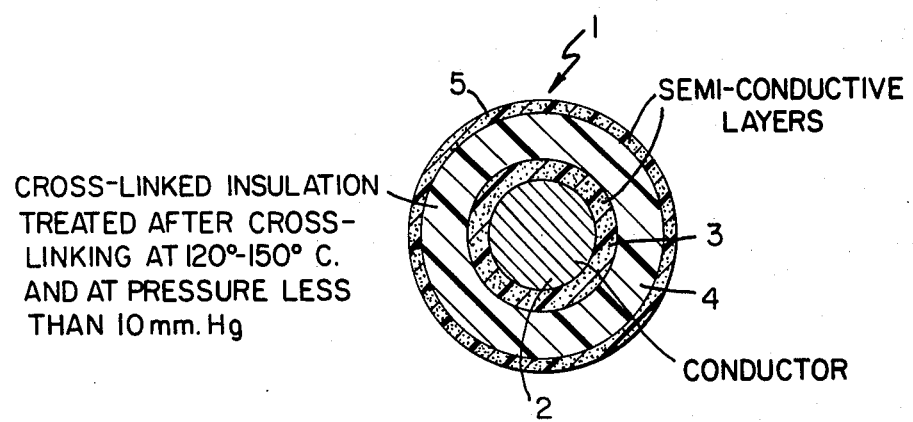

ELECTRIC CABLES OF REDUCED MICRO-VOIDS IN THE EXTRUDED INSULATION

This is a division of application Ser. No. 30,726, filed 4/17/79 now U.S. Pat. No. 4,259,281.

The present invention refers to a cable process for reducing micro-voids which form in the extruded insulation of medium and high voltage electric cables, as a consequence of the step of cross-linking of the insulation itself.

Extruded insulation means herein a plastic material, such as polyethylene or other polyolefinic compound or an elastomeric material, which is extruded around the conductor or conductors of an electric cable and which is afterwards cross-linked.

As is known, the cross-linking process (or vulcanization) has the object of increasing the temperature range in which the mechanical strength of the insulation is sufficient to permit the use of the insulation. Said process essentially consists of a high temperature treatment of the insulation in the presence of substances which decompose, at a such temperature, into radicals which link to the macromolecules and forming transverse bridges among the polymeric chains. The substances generally used as cross-linking agents are organic peroxides.

The cross-linking processing of the insulation can be technically carried out in different ways, each of which has advantages and drawbacks. The more usual process (both continuous and discontinuous) consists of heating the insulation by saturated steam at high pressure. The working conditions are about 200° C. of temperature and 14 atmospheres of relative pressure, and the time to complete the cross-linking depends essentially on the nature and the thickness of the extruded insulation. The main advantages of this method are of the simplicity of the processing plant and the low operating cost, whereas the drawback is that of a great diffusion of the steam into the plastic mass.

During the following cooling process, which usually is quite rapid, only a small part of the water, which was dissolved in the mass, is able to diffuse to the outside thereof, and the other part of the water remains in the consolidated mass, generally, in the form of microscopic drops. Even if the water is able to leave the mass slowly, the space taken up by said microscopic drops does not close up immediately. As a result, in the solid mass of the insulation, there is a great quantity of very small cavities (micro-voids) partly filled with water and partly empty.

The order of magnitude of the diameter of these cavities is of few microns, i.e. 0.1 to 10 microns. However, said cavities can sometimes be so numerous and so near the one to the other as to appear as opalescent zones or "milky-zones". An approximate quantitative determination of the numbered micro-voids per unit volume can be made by examining insulation sections under a microscope.

Actually, not only the steam, but also the decomposition products of the cross-linking agent contribute to the formation of these micro-voids, the cross-linking agent contributing by a mechanisms similar to that described for the steam. The contribution of said decomposition products is, without doubt, great even if, from a quantitative point of view, the contribution is clearly lower with respect to contribution of the steam.

It has been shown that both the steam and the decomposition products of the cross-linking agent succeed spontaneously, even if slowly, in diffusing towards the outside of the consolidated mass and that the micro-voids forming in consequence of the migration and release of said products close again with the passing of time, by virtue of the spontaneous and random, even if small, movements of the macromolecules. However, this spontaneous closing process of the micro-voids can last years, so that, as a matter of fact, said micro-voids remain in the mass of the insulation for a very long time.

It is not yet completely clear how much these micro-voids affect the dielectric properties of the extruded insulation which surrounds the cable conductors, but certainly, the dielectric properties of the insulation are reduced in a way not determinable in advance and forseeable. In order to avoid this hazardous drawback, cross-linking processes alternative to the process of using saturated steam have already been proposed and carried out for several years. Said processes are generically known to those skilled in the art as dry cross-linking, or dry-curing processes. Included in such known techniques are the processes which use, as means for heat transmission, one of the following fluids under pressure: inert gas, glycola of high molecular weight, melted salt baths, low-melting alloys, e.g. Wood's metal, silicone oils, etc. In other dry-curing processes, the cross-linking is caused by heat radiation or by ultrasonic energy.

In another process, resort is had to the expedient of covering, before the cross-linking by steam, the extruded insulation with thin sheaths of plastic material containing moisture acceptor compounds, for example, calcium oxide which prevent or reduce the diffusion of the steam into the extruded mass in contact with the conductors.

In effect, all the aforementioned dry, cross-linking processes permit a reduction in the number of micro-voids, but not beyond a certain limit, since said processes cannot prevent the formation of micro-voids caused by the decomposition products of the cross-linking agent. Moreover, all these dry-curing processes require complicated plants and rather critical working conditions. Also the economic burden, including the cost of the raw materials and of the energy consumption, is clearly higher with respect to the process of cross-linking using saturated steam.

Therefore, it is desirable to make use of all the technological and economic advantages offered by the cross-linking process using saturated steam by causing the elimination of the small water drops and of the decomposition products of the cross-linking agent by means of a treatment after the cross-linking process is completed.

From a theoretical point of view, it appears that such a treatment of the cross-linked insulation, consisting practically of degassing a mass such as that in question, would have to be based on a heat treatment at a reduced pressure. The effectiveness of such treatment in degassing is confirmed by the results reported in the publication entitled "Micro-voids in Cross-Linked Polyethylene Insulated Cables," IEEE Transactions on Power Apparatus and System Review (vol. PAS-94, n.4, July/August 1975, pages 1258–1263). In the said publication, however, no indication of the working conditions (temperature, pressure, time) of the treatment is given. Therefore, it is not possible to get any actual technical teaching from this publication. The article provides only experimental confirmation of the theory that heating at a reduced pressure of a plastic mass favours the removal of the volatile substances included in it and the consequent closing of the micro-voids, in consequence of the increased movement intensity of the macromolecules on the walls of the micro-voids as a result of the heat.

Moreover, from the data reported in table 4 of said publication, one is led to believe that a heat treatment at a low pressure after the cross-linking process, degrades at least partially, the dielectric properties of the extruded insulating material. In fact, with regard to the examples 1 and 2 therein, which refer to the more usually used material, i.e. the cross-linked polyethylene, it is noted that the nominal perforation gradient with alternate current (BDV) undergoes, in consequence of said treatment, a significant reduction.

Therefore, said publication, on the one hand does not report any operating condition with respect to the elimination of the micro-voids, and on the other hand does not consider that the heat treatment at low pressure is favourable with respect to an improvement of the dielectric properties of the extruded insulation.

On the contrary, the applicants have found, to their surprise, that it is possible to establish ranges of values for the temperature, the pressure and the time, in which it is possible to obtain an optimum result with respect to the reduction of micro-voids and without damage to the dielectric properties of the insulation, which properties are, on the contrary significantly improved.

One object of the present invention is to provide working conditions for the treatment of cross-linked insulation to improve such insulation which conditions do not refer only to the extruded insulation material, but also refer to the manufactured article comprising the metallic conductor and the extruded insulation. As is known, this involves the discovery of new elements which are not always foreseeable either on a theoretical basis or on an experimental one.

Therefore, the present invention comprises a teaching contrary to the teachings of the prior art and provides, moreover, working paramaters advantageously applicable on an industrial scale.

Accordingly, one object of the present invention is a process for reducing micro-voids in the extruded insulation around the conductor or conductors of a medium and high voltage electric cable, characterized by the fact that it consists of a heat treatment at a low pressure after the cross-linking process of said extruded insulation in the presence of cross-linking agents, the temperature of said heat treatment being between about 120° and about 150° C. and the pressure of the insulation ambient being lower than 10 mm. Hg. The time required for said heat treatment is, under static condition, between about 8 and about 48 hours.

A further object of the present invention is an electric cable suitable for use at medium and high voltages, which is made by subjecting the extruded insulation, after the cross-linking, to a treatment for reducing the micro-voids according to the present invention.

Other objects and advantages of the invention will be apparent from the following detailed description of preferred embodiments thereof, which description should be considered in conjunction with the accompanying drawing, the single figure of which is a cross-section of a cable made in accordance with the invention.

The cable core 1 illustrated in FIG. 1 has a central conductor 2, a semi-conducting layer 3 around the conductor 2, a cross-linked layer 4 of insulation treated in accordance with the invention and a semi-conducting layer 5. The final cable may, of course, include other layers, such as an outer protective sheath, and the process of the invention is applicable to cables including a plurality of insulated conductors.

According to a first example of the invention, a red copper conductor 2 having a section of 240 mm$^2$ able to operate at a rated voltage of 60 kV, is covered with a first semi-conducting layer 3, with an insulating layer 4 of polyethylene to be cross-linked and having a thickness of 14 mm, and lastly with a second semi-conductor layer 5.

The polyethylene contains, as the cross-linking agent, dicumylperoxide in a quantity of 1.8 parts by weight per 100 parts by weight of polyethylene. The semi-conductor layers are made of ethylene/propylene rubber loaded with conductive carbon black.

The so-obtained core 1, formed by the conductor 2, the extruded insulation 4 and the semi-conducting layers 3 and 5 is moved along a continuous cross-linking line. Said cross-linking line is constituted by a tube in which the advancing core is covered, in counter-current, by saturated steam at a temperature of about 200° C. and therefore, at a pressure of about 14 atmospheres above atmospheric pressure.

At the end of the cross-linking process, the insulation contains a quantity of micro-voids, of a diameter comprised between 0.1–10 microns, equal to $10^4$–$10^5$ per mm$^3$. It has been established that the nominal voltage breakdown strength or perforation gradient of such insulation for alternating current for cable lengths of 10 meters is 39 kV/mm.

The core 1 coming out from the cross-linking line is wound up in coils, which are subsequently disposed in a heated chamber and at low pressure for the treatment for the reduction of micro-voids according to the present invention.

In order to make the heating of the core 1 easier and, therefore, to reduce the treatment times, it is convenient to take advantage of the Joule effect, that is, to connect the ends of the conductor 2 to a current source and cause current to circulate in the conductor 2. The heating of the core 1 at the conductor 2 has also the great advantage of directing the diffusion and the ejection of the contained volatile substance, steam and degradation products of the cross-linking agent, toward the outer surfaces of the wound coil.

The preferred treatment conditions, at steady state, are as follows: 135° C. for a median temperature of the conductor 2 carrying current, 130° C. for the median temperature of the chamber, 1 mm. of mercury for the pressure and 24 hours for the time.

At the end of said treatment, the extruded insulation shows under a microscope the presence of few micro-voids, less than $10^2$ per mm$^3$, whereas the nominal perforation gradient for alternating current for cable lengths of 10 m. has increased to 52 kV/mm.

In a second example, a tinned copper conductor 2, having a section of 630 mm$^2$ and designed to operate at a rated voltage of 60 kV, is covered, with successive extrusions, with a first semi-conductor layer 3, an insulating layer 4 of polyethylene to be cross-linked having a thickness of 13 mm, and, at last, with a second semi-conductor layer 5. The polyethylene contains, as the cross-linking agent, dicumylperoxide in a quantity of 1.8 parts by weight per 100 parts by weight of polyethylene. The semi-conductor layers are made of ethylene/-propylene rubber loaded with conductive carbon black.

The so-obtained core 1 is subjected to a cross-linking process with saturated steam at high pressure under the same working conditions as those described in the previous example. At the end of the cross-linking process, the insulation 4 contains a quantity of micro-voids, of a diameter from 0.1 to 10 microns, equal to $10^4$-$10^5$ per mm$^3$. It has been established that the nominal performation gradient for such core with alternating current for cable lengths of 10 m is 37 kV/mm.

The coils of the wound core are thereafter subjected to the heat treatment according to the present invention at the same conditions described in the previous example.

The working conditions, at steady state, are as follows: 135° C. for a median temperature of the conductor 2 carrying current, 130° C. for a median chamber temperature, 1 mm. of mercury for pressure and 48 hours for the time.

At the end of said treatment the extruded insulation has few micro-voids, less than $10^2$ per mm$^3$, whereas the nominal perforation gradient for alternating current for cable lengths of 10 m. has increased to 50 kV/mm.

The following tables summarizes the working conditions of the cross-linking process by saturated steam and of the subsequent treatment according to the present invention, and the dielectric properties of the extruded insulation at the end of the cross-linking and after the treatment for reducing the micro-voids according to the present invention.

TABLE I

| | | Examples | |
|---|---|---|---|
| | | No. 1 | No. 2 |
| conductor | — | red copper | tinned copper |
| conductor | mm$^2$ | 240 | 630 |
| rated voltage | kV | 60 | 60 |
| insulating material | — | extruded polyethylene | extruded polyethylene |
| insulating thickness | mm | 14 | 13 |
| cross-linking agent | — | dicumylperoxide | dicumylperoxide |
| cross-linking agent of insulation | pts. by wt. | 1.8 | 1.8 |
| semiconductive layers | | ethylene/propylene rubber loaded with conductive carbon black | ethylene propylene rubber loaded with conductive carbon black |

TABLE II

| | | Example 1 | Example 2 |
|---|---|---|---|
| CROSS-LINKING PROCESS | | | |
| saturated steam temperature | °C. | about 200 | about 200 |
| saturated steam pressure | relative atm. | 14 | 14 |
| micro-voids in the insulation after the cross-linking | micro-voids/mm$^3$ | $10^4$-$10^5$ | $10^4$-$10^5$ |
| nominal perforation gradient with alternating current after the cross-linking | kV/mm (for cable lengths of 10 m.) | 39 | 37 |
| TREATMENT FOR REDUCING MICRO-VOIDS | | | |
| median temperature of the conductor carrying current | °C. | 135 | 135 |
| median chamber temperature | °C. | 130 | 130 |
| pressure | mm Hg | 1 | 1 |
| treatment time | hours | 24 | 48 |
| micro-voids in the insulating after the treatment | micro-voids mm$^3$ | very rare less than $10^2$ | very rare less than $10^2$ |
| nominal perforation gradient with alternating current after the treatment for reducing micro-voids | kV/mm (for cable lengths of 10 m.) | 52 | 50 |

It will be observed from Tables I and II that the voltage breakdown strength, or perforation gradient of the insulation increases by at least 25% and that the number of micro-voids decreases to one-half or less. A cable treated in accordance with the invention may be distinguished from an untreated same cable by having an increased perforation gradient and not having in excess of $10^3$ micro-voids per mm$^3$ and preferably, less than $10^2$ micro-voids per mm$^3$.

Although, in the above two examples, the treatment for reducing micro-voids is made after a cross-linking process by saturated steam at high pressure, it will be apparent that the same treatment can be advantageously applied also after other cross-linking processes, particularly those called dry cross-linking or dry-curing.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. An electric cable for use at medium and high voltages, said cable comprising a conductor surrounded by a first semi-conductive layer which is surrounded by solid insulation which in turn is surrounded by second semi-conductive layer, said solid insulation being an extruded, peroxide cross-linked, plastic material which has been treated subsequent to the cross-linking thereof by subjecting it to heat at a temperature in the range from about 120° C. to 150° C. and an ambient pressure less than 10 mm. Hg. to remove decomposition products and reduce the number of micro-voids formed during the cross-linking, said insulation being characterized by a perforation gradient better than the same insulation which has not been so treated, being substantially free of said decomposition products and having a number of micro-voids less than the same insulation which has not been so treated and less than $10^3$ per mm$^3$ whereby the perforation gradient is improved and the stability of the insulating properties of the insulation remains substantially constant with use over a period of time.

2. An electric cable as set forth in claim 1 wherein the perforation gradient of the insulation is at least 10% greater than the same cable untreated and the insulation has a number of micro-voids less than $10^2$ per mm$^3$.

3. An electric cable as set forth in claim 1 wherein the perforation gradient of the insulation is at least 45 kilovolts per mm. and the insulation has a number of micro-voids less than $10^2$ per mm$^3$.

4. An electric cable as set forth in claim 3 wherein said insulation is unfilled, peroxide cross-linked polyethylene without a voltage stabilizer therein.

* * * * *